United States Patent [19]
Bennett

[11] Patent Number: 4,694,811
[45] Date of Patent: Sep. 22, 1987

[54] AIR-GAS MIXING DEVICE WITH DUAL-CONTROL FUEL VALVE

[75] Inventor: David E. Bennett, Hermosa Beach, Calif.

[73] Assignee: Impco Carburetion, Inc., Cerritos, Calif.

[21] Appl. No.: 778,482

[22] Filed: Sep. 20, 1985

[51] Int. Cl.⁴ ............................................. F02B 43/00
[52] U.S. Cl. ............................. 123/527; 123/27 GE; 123/575; 48/189.1
[58] Field of Search .................. 123/527, 27 GE, 575; 48/189.1

[56] References Cited

U.S. PATENT DOCUMENTS

| | | | |
|---|---|---|---|
| 2,896,599 | 7/1959 | Ensign | 123/527 |
| 2,927,848 | 3/1960 | Baverstock | 123/527 |
| 3,545,948 | 12/1970 | Baverstock | 48/184 |
| 3,741,737 | 6/1973 | Jones | 123/527 |
| 3,846,094 | 11/1974 | Baverstock | 48/180 C |
| 4,020,810 | 5/1977 | Baverstock | 123/527 |
| 4,098,248 | 7/1978 | Todd | 123/527 |
| 4,413,607 | 11/1983 | Batchelor et al. | 123/590 |
| 4,440,137 | 4/1984 | Ligano et al. | 12/527 |
| 4,449,509 | 5/1984 | Young | 123/527 |

Primary Examiner—E. Rollins Cross
Attorney, Agent, or Firm—Thomas A. Seeman

[57] ABSTRACT

An air-gas mixing device of the type used to mix air and gaseous fuel as a gaseous fuel charge for an internal combustion engine. Fuel and air valves for controlling the air/fuel mixture are coupled together and actuated by a diaphragm in response to a fluid pressure signal, derived from the intake manifold pressure of the engine, acting on the diaphragm. The fuel valve is also independently acutated by a stepper motor mounted to the diaphragm and operated by a remote electrical control signal from a controller designed to measure engine performance and provide a signal to correct any deficiencies in the air/fuel mixture such as a feedback controller receiving inputs from oxygen, speed and other sensors for measuring engine performance. Becuase of the dual control of the fuel valve, the device is capable of handling a wide range of gaseous fuels of different BTU content and of providing a more optimum air/fuel mixture for better fuel economy, emissions control and engine performance.

19 Claims, 5 Drawing Figures

AIR-GAS MIXING DEVICE WITH DUAL-CONTROL FUEL VALVE

BACKGROUND OF INVENTION

This invention relates generally to air-gas mixing devices of the type used to mix air and gaseous fuel, such as gaseous LPG or natural gas, as a gaseous fuel charge for an internal combustion engine; and more particularly of the type in which air and gas valves for the controlling the air/fuel ratio of the fuel charge are actuated in response to a pressure signal derived from the intake manifold pressure of the engine.

Mixing devices for mixing air with a gaseous fuels are well known. Such a device is commonly attached, together with a butterfly valve, to an intake manifold of an internal combustion engine in lieu of a conventional liquid fuel carburetor when it is desired to operate the engine with gaseous fuel. In operation, the device typically mixes in a mixing chamber air and gaseous fuels in proper proportion for a particular engine load in response to engine intake manifold pressure, which is indicative of engine load requirements, and discharges the mixture in the intake manifold. Air and gas valves within the device control the amount and mixture of the air/fuel charge.

In one such device, shown in U.S. Pat. No. 3,545,948, the air and gas valves are actuated in unison by a diaphragm operated by a pressure signal derived from the intake manifold pressure. The diaphragm opens the valves in response to negative vacuum manifold pressure, and the size and degree of the valve openings, and therefore the air/fuel mixture, at any given manifold pressure are predetermined for the particular fuel and engine on which the device is installed.

A problem with such known air-gas mixing devices is that once installed, the devices cannot feasibly accommodate different gaseous fuels. This is because the fuel valve when opened cannot be independently adjusted to enrich or lean the air/fuel mixture for the particular fuel being utilized. This problem occurs most commonly in the oil refining industry where such devices are installed in industrial engines that are fueled with gaseous fuels left over from the cracking processes. These gaseous fuels vary in their BTU content, depending, for example, on whether the gaseous fuel arises from cracking petroleum for jet fuel or heating oil. Because of the difference in BTU content, it is necessary to adjust the air/fuel mixture for any given engine load when the fuel is changed, which may occur frequently or even continuously. An attempt has been made to accomplish this by providing a mechanical adjustment screw to adjust fuel flow upstream of the fuel inlet of the device, but this is time consuming and the mechanical adjustment screw wears out in time.

Another problem is that such devices do not always provide the most optimum air/fuel mixture for all ranges of engine performance. This is because the air and fuel valves are controlled solely by a fluid pressure signal derived from intake manifold pressure. Although this pressure signal is an indicator of engine load and provides an effective air/fuel mixture for engine performance under most engine conditions, the pressure signal alone cannot be relied upon to provide an optimum air/fuel mixture for all ranges and conditions of engine performance. To accomplish this, it is preferable to adjust the air/fuel mixture from time to time by means of a second control signal from a feedback controller of the type that monitors engine performance in response to inputs from speed, oxygen, vacuum and/or other sensors of engine performance and emits a control signal in response to these sensors. Attempts have been made to adjust the air/fuel mixture by providing an adjustable air by-pass around the fuel valve to lean out a predetermined enriched mixture in response to such a control signal, or by adjusting the pressure of the gaseous fuel to the mixing chamber in response to the control signal. However, these solutions suffer from reliability problems and have inherent time delays which adversely affect engine performance.

SUMMARY OF THE INVENTION

Accordingly, it is an object of this invention to provide an air-gas mixing device which may be quickly and remotely adjusted to handle a wide variety of gaseous fuels for a particular engine application.

It is an another object of this invention to provide an air-gas mixing device with air and gaseous fuel valves actuated in unison in response to a first control signal derived from engine intake manifold pressure and with the fuel valve also being remotely independently actuated by a second control signal for adjustment of the fuel valve while being actuated by the first control signal.

Another object of this invention is to provide an air-gas mixing device with a diaphragm actuated air and fuel valves actuated in response to a fluid pressure signal derived from intake manifold pressure of an internal combustion engine and with the fuel valve also being remotely independently adjusted by a feedback control signal from a feedback controller for adjusting the air/fuel mixture in response to engine output conditions.

Still another object of this invention is to provide an air-gas mixing device which is economical and feasible to manufacture.

In accordance with these objects, the invention comprises an air-gas mixing device of the type used to mix gaseous fuel with air as a fuel mixture or charge for an internal combustion engine. The device has a housing with an air inlet, a fuel inlet and an air-fuel mixture discharge outlet downstream of the air inlet. The housing is adapted to be attached to an engine intake manifold through an adapter having an included butterfly or throttle valve such that the mixture is discharged into the intake manifold in response to the position of the butterfly valve. Air and gaseous fuel valves respectively control the amount and the mixture of the air and fuel discharge from the device. The air and fuel valves are coupled to a flexible diaphragm and are actuated in unison by the diaphragm which is moved in response to a fluid pressure signal derived from the engine intake manifold pressure. The degree to which the air and fuel valves are opened for any given intake manifold pressure is predetermined for the particular fuel and engine application with which the device is utilized to provide an appropriate air/fuel mixture for the particular engine application.

The fuel valve is also independently actuated by a stepper motor mounted to the diaphragm in response to a second control signal, such as from a remote feedback controller, to provide an independent actuator means for the fuel valve while the valve is also being actuated by the diaphragm. With the use of the stepper motor, the fuel valve may be remotely and independently adjusted to modify the air/fuel mixture for different gaseous fuels and for a more optimum air/fuel ratio for any given engine operating condition.

Two embodiments of the device are shown and described. In a first embodiment, the housing of the device is structured to receive air through the top of the housing and in a second embodiment, the housing is structured to receive air through the side of the housing, when it is desirable for space and other considerations.

The invention accordingly comprises the feature of construction, combination of elements and arrangements of parts which will be exemplified in the construction hereinafter set forth, and the scope of the invention will be indicated in the claims.

BRIEF DESCRIPTION OF THE DRAWINGS

For a fuller understanding of the nature of the objects of the invention, reference should be made to the following detailed description taken in connection with the accompanying drawings in which.

Similar reference characters refer to similar parts throughout the several views of the drawings.

DETAILED DESCRIPTION OF THE PREFERRED EMBODIMENT

Referring now to the drawings in detail, there is illustrated therein a preferred embodiment of an air-gas mixing device 10 comprising this invention.

Referring first to FIGS. 1 through 4, as will be explained more fully in subsequent paragraphs, in a first embodiment, the air-gas mixing device 10 is formed with a symmetrical housing 11 having an air duct 12 extending through the housing from an air inlet 13 at the upper end of the housing to a an air/fuel mixture discharge outlet 14 at the bottom of the housing. Centrally located within the housing is an axially movable, composite valve carrier or member 15 with an included air valve seat element 16 and fuel valve head 18, comprising elements of respective air and fuel valves, for controlling the flow of air and fuel respectively and thereby the air/fuel mixture through the discharge outlet 14. The air valve element and fuel valve head are actuated in unison by movement of a diaphragm 20 which moves the composite valve member in response to a fluid pressure signal derived from an engine intake manifold. The fuel valve head is also independently actuated by a stepper motor 22 mounted to the diaphragm for varying the rate of fuel flow in response to a control signal from a feedback controller receiving inputs from a plurality of sources for measuring engine performance such as an oxygen sensor for measuring oxygen content in an exhaust manifold, a speed sensor for measuring engine speed, and a vacuum sensor for measuring intake manifold vacuum. The device is shown with the composite valve member 15, and the air and gas valves, in an open position in FIG. 1 and in a closed position in FIG. 2.

Figure 1:
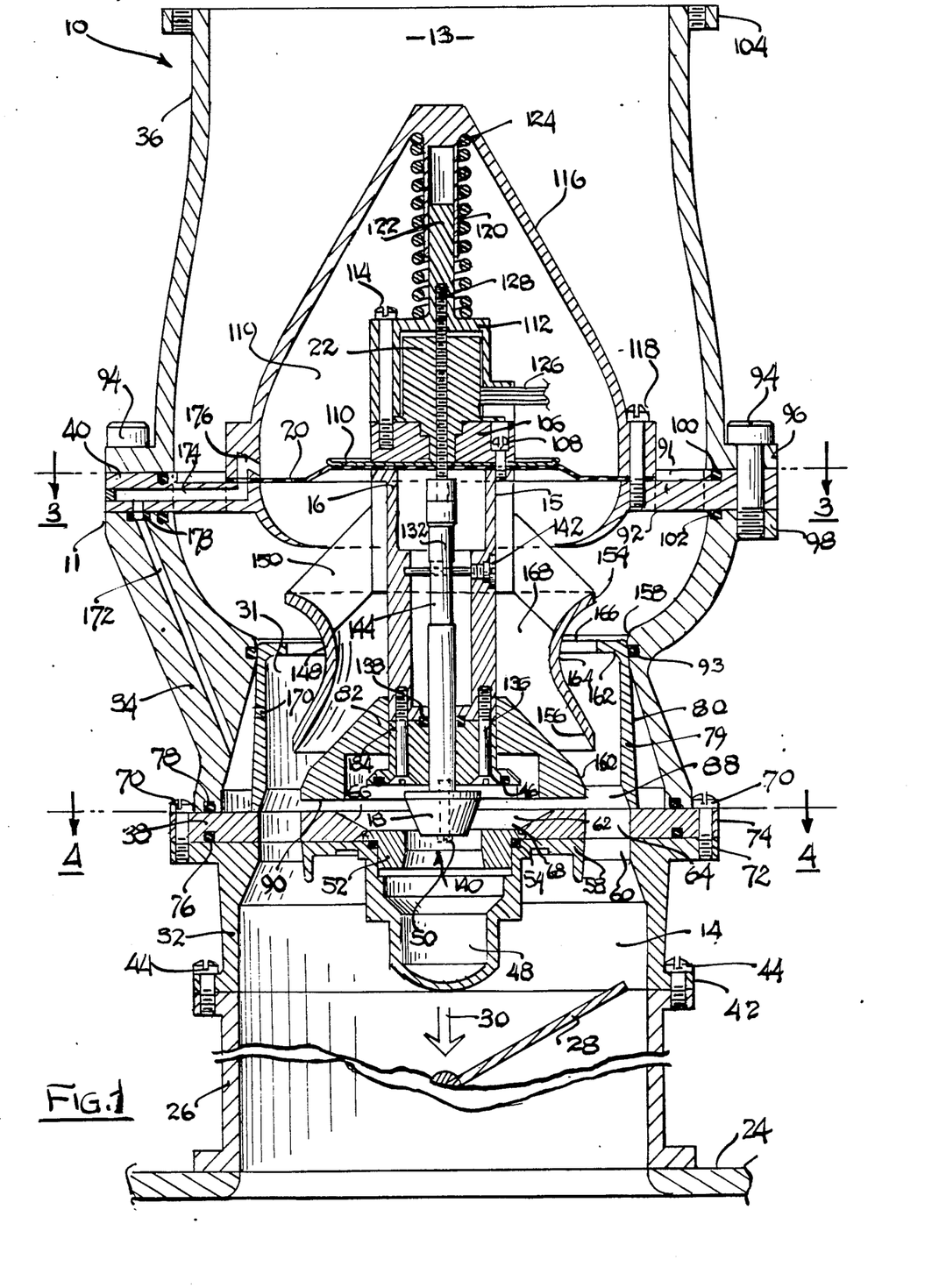
FIG. 1 is side elevation, in cutaway axial cross-section, of a first embodiment of the invention with the air and gas valves in an open position.

Describing the device with greater particularity, the device is typically mounted to an air intake conduit means of an engine such as an air intake manifold 24 through an adapter 26. A conventional butterfly-type throttle valve 28, only a portion of which is shown, is pivotably mounted to the adapter and serves to regulate the rate of flow through the mixture discharge outlet 14 at the bottom of the housing. The mixing device, with a butterfly valve, constitutes a carburetor. Arrow 30 indicates the axis of outlet flow from the mixing device toward the engine intake manifold. The pressure in the intermediate portion 31 of the air duct is a derivative and function of the pressure in the engine intake manifold, although it is not usually identical thereto while the engine is in operation.

The housing includes a base 32, an intermediate housing section 34, and an upper housing section 36. A spacer plate 38 is located between the base 32 and the intermediate section 34, and a diaphragm mounting plate 40 is located between the upper section 36 and the intermediate section 34. Bosses 42 are provided at the lower end of the base for connection of the base to the adapter by screws 44.

A threaded fuel supply port 46 for connection to a fuel supply source, not shown, is formed in the side wall of the base and is in fluid communication with a fuel inlet conduit 48 which extends from the port to the central portion of the mixing device where it terminates in an upwardly facing inlet 50. (The structure of the fuel supply port and fuel inlet conduit may be more easily visualized by referring to the alternate embodiment of FIG. 5 which shows a side view of the conduit). A fuel valve seat 52 is removably positioned within the fuel inlet, and an O-Ring 54 is positioned on an annular shoulder along the upper corner of the wall of the valve seat opening to seal the wall against gaseous fuel leakage. The fuel valve seat together with the fuel valve head constitute a fuel valve for controlling the fuel flow from the fuel inlet and are configured in shape and size for the particular engine application in which the device is intended to be installed.

An annular platform 58 extends about the fuel inlet opening to the interior sidewall of the base, and arcuate passages 60 are provided between the platform and the sidewall of the base 32 for passage of fuel and air through the base.

The spacer plate 38 has a central opening 62 overlaying the fuel inlet and the valve seat 52 for passage of fuel from the fuel inlet and has arcuate discharge passages 64 along its perimeter suitably positioned to overlay the discharge passages 60 in the support platform of the base portion of the housing for the passage of fuel and air through the spacer plate and the support platform. The central opening 62 has a tapered sidewall 66 to facilitate the flow of gaseous fuel from the fuel inlet to the discharge passages 64 and the inner end of the sidewall is stepped with a notch 68 to receive a corresponding stepped portion of the fuel valve seat 52 and to thereby retain the valve seat within the valve seat opening. The spacer plate is clamped between the base 32 and intermediate section 34 of the housing by screws 70 extending through flanges 72, 74 along the top of the base and the bottom of the intermediate section 34 respectively. O-Rings 76, 78 respectively positioned within annular grooves along the lower surface of the spacer plate and along the lower surface of the intermediate section seal the juncture.

Located within the housing and clamped to the top of the spacer plate 38 is a symmetrical, removable core member 79 having an upright wall 80 and an integral, interior conical section 82 with a central opening to slidably receive the lower end of the composite valve member 15 and retain it in axial alignment. The upright wall 80 is connected to the conical section 82 by connecting bridges located on opposite ends of the base of the conical wall section, and arcuate discharge passages 88 are provided between the bridges and between the perimeter of the conical wall section and the upright wall 80 for passage of air and fuel. The air discharge passages 88 overlay the air/fuel discharge passages 64 in the spacer place and the discharge passages 60 in the base portion for discharge of air and fuel to the discharge outlet 14. Both the upright wall 80 and the conical wall 82 are impermeable structures. Importantly the base portion 90 of the conical wall section is raised slightly to provide a gap between the conical section and the spacer plate for communication of fuel flow from the fuel inlet to the discharge passages 64 in the spacer plate. A plurality of foot pads, not shown, extend from the base of the conical section about the periphery of the section to the top of the spacer plate to prevent the central portion of the section from flexing in response to vacuum pressure. The core is clamped to the top of the spacer plate by contact of the upright wall 80 with the interior wall of the intermediate housing section 34 when the intermediate section is fastened to the base 32. Alternatively, the core member may be fastened to the base by screws, not shown, extending through a flange on the bottom of the core member at the base of the upright wall 80, through the spacer plate and into the base. An O-Ring 93 is located in an annular groove along the inner wall of the intermediate housing section at the point of contact with the upright wall 80 to seal the point of contact.

Figure 3:
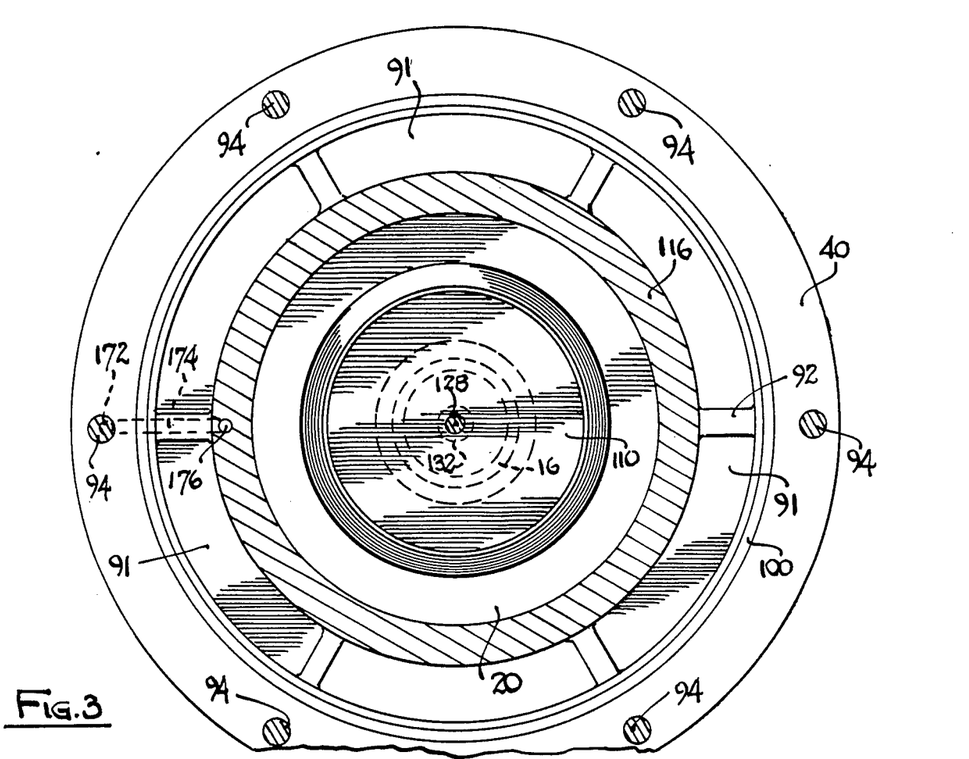
FIG. 3 is a cross-sectional view taken along the line 3—3 of FIG. 1.
Figure 4:
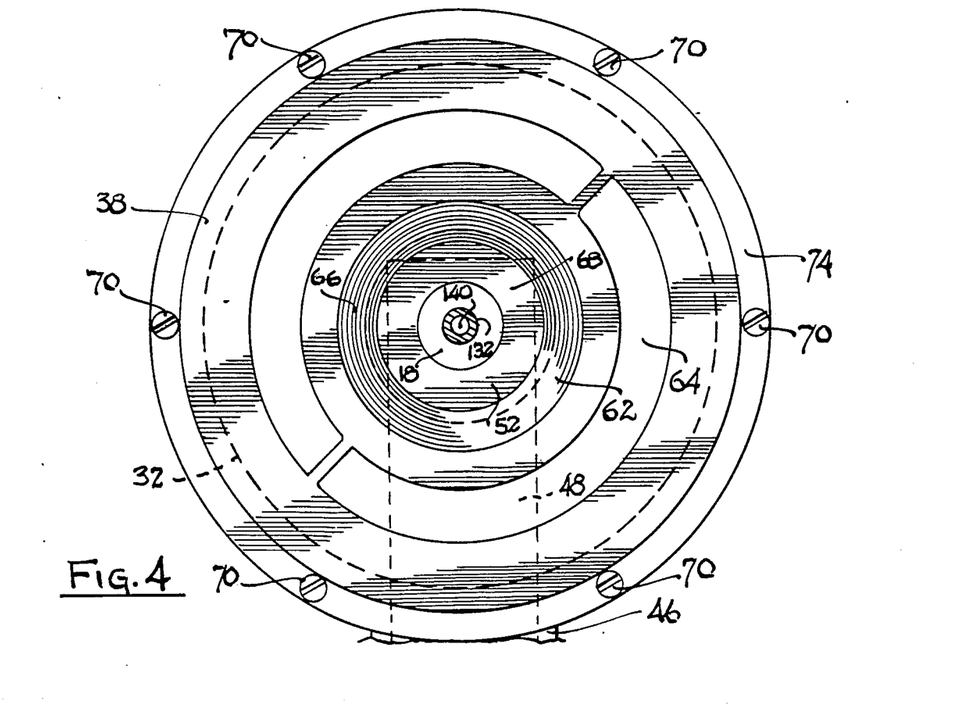
FIG. 4 is a cross-sectional view taken along the line 4—4 of FIG. 1.

The diaphragm mounting plate 40 is clamped between the upper housing section 36 and the intermediate housing section 34 by screws 94 extending through flanges 96, 98 on the respective members. O-Rings 100, 102 placed respectively within annular grooves in the support plate and in the top wall surface of the intermediate housing section seal the adjoining members. A plurality of arcuate air passages 91, as best seen in FIG. 3, extend through the mounting plate adjacent to the wall of the housing for passage of air through the mounting plate. The passages are separated by radial connecting struts or arms 92. The central portion of the diaphragm mounting plate 40 is dish-shaped with an enlarged opening for receipt of the diaphragm and the composite valve member 15.

The upper housing section 36 is open at the top for the receipt of air into the mixing device and the opening constitutes the air inlet 13. An air filter, not shown, is preferably attached to the top of the housing to filter incoming air, and a flange 104 with screw mounting holes is provided along the top rim of the upper section for attachment of the air filter or for attachment of an air filter adapter, not shown.

The composite air valve member 15 is operatively mounted to the diaphragm 20 by being clamped to the diaphragm with the diaphragm located between the top of air valve element 16 and a support block 106 for the stepper motor 22 by screws 108 extending through the support block and threaded to the air valve element 16. A diaphragm back-up plate 110 is positioned between the diaphragm and stepper motor support block to reinforce the diaphragm in this area. The stepper motor is housed within a stepper motor housing 112 that is fastened to the support block 102 by a pair of screws 114.

A dome-like cover 116 is positioned over the stepper motor housing and fastened to the diaphragm mounting plate 40 inwardly of the air passages 91 by mounting screws 118 threaded to the mounting plate. The diaphragm 20 is clamped between the cover and the mounting plate along the perimeter of the diaphragm, and a sealing gasket located underneath and in contact with the diaphragm seals the space 119 above the diaphragm and underneath the cover substantially against air leakage. This space 119 above the diaphragm and beneath the cover 116 is an actuation chamber for actuating the diaphragm. The cover 116 has a downwardly extending sleeve 120 and is positioned over a mating alignment post 122 extending upwardly from the top of the stepper motor housing 112 to maintain the upper end of the composite valve member 15 in axial alignment during vertical movement. Spring 124 located between the stepper motor housing 112 and the cover 116 biases the composite valve member 15 downwardly toward its closed position.

The stepper motor 22 receives an electrical control signal from a feedback controller, not shown, through an electrical conduit 126. A worm screw 128 extending through the central axis of the stepper motor is moved axially in response to the signal to raise or lower the operatively connected fuel control head 18, and thereby actuate the fuel valve. The worm screw is fastened to the upper end of a connecting rod 132 such that the worm screw is prevented from rotating relative to the connecting rod. The connecting rod extends through a hollow core in the air valve element and through a central opening in an end cap 134 attached to the bottom of the air valve element by screws 136. A circular flexible seal 138 is provided in an enlarged recess at the interface of the air valve element 16 and end cap 134 for sealing contact with the connecting rod. The fuel valve head 18 is removably secured to the bottom end of the connecting rod by screw 140. A rotation prevention screw 142 extends through a longitudinal slot 144 in the connecting rod to prevent the rod and connected worm screw from rotating which causes the worm screw to move in an axial direction when the stepper motor is operated. The longitudinal slot 144 is of sufficient length to permit the connecting rod to be moved axially by the stepper motor for a full predetermined travel of the fuel valve head 18.

An O-Ring 146 is provided within an annular groove along the bottom of the end cap to further seal the fuel valve inlet 50 against fuel leakage by sealing contact of the O-Ring with the fuel valve seat 52 when the composite valve member 15 is biased downwardly in its fully seated or closed position.

The air valve element 16 includes an outer continuous seating ring 148 connected by a plurality of webs 150 to the central body of the valve element. The continuous ring has upper and lower movable air valve seats 154, 156 thereon for respective seating engagement with an upper stationary air valve seat 158 located on the upright wall 80 of the core member 79 and with a lower stationary air valve seat 160 located on the outer wall of conical section 82 of the core member.

Figure 2:
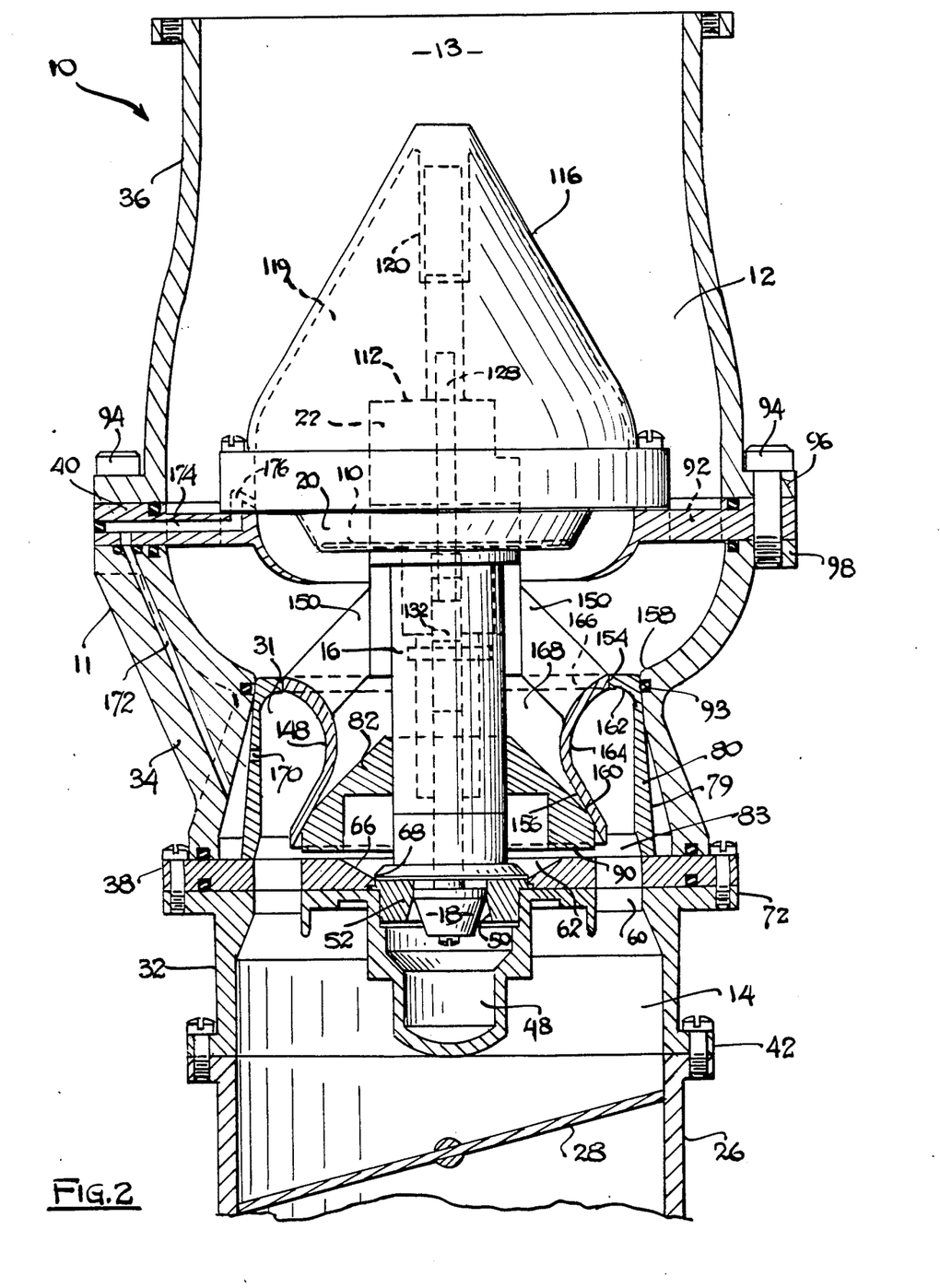
FIG. 2 is a side elevation, partially in cutaway axial cross-section, of the embodiment shown in FIG. 1 but with the air and gas valves in a closed position.

The movable air valve seats 154, 156 are designed to move toward and away from the respective upper and lower stationary air valve seats 158, 160 so as to make an operative seal when in a closed position as shown in FIG. 2 and to be spaced apart to permit air flow when in an open position as shown in FIG. 1. Therefore, the seats 154 and 156 are axially spaced apart from each other by the same distance as seats 158 and 160. As should be obvious, the stationary and movable air valve seats comprise elements of an air valve for controlling the flow of air through the air duct in the housing.

One and preferably both of the stationary seats 158, 160 has adjacent to it a wall which diverges therefrom. For example, the upright wall 80 of the core member 79 has a surface 162 which diverges outwardly from seat 158 as it extends downwardly. Also the outer wall of conical section 82 converges toward the center as it extends axially away from seat 160. Both sets of surfaces are not required, although they are convenient in providing optimum air flow with a minimum energy loss as the air passes though the air valve. However, at least one of these surfaces should be provided, and it preferably will be surface 162 in order that it can cooperate with a peripheral recessed wall 164 of the seating ring 148 of the air valve element 16. The advantage of recessed wall 164 can best be seen in FIG. 1 which illustrates the open position of the air valve, and it will be noted that in this position a first air passage 166 is formed between wall 164 and stationary seat 158 and a second air passage 168 is formed between stationary seat 160 and the inner wall of the seating ring 148 of the valve element 16. This latter wall also can be contoured for most effective air flow.

It will further be noted that the differences between the diameters of the seats are not great and therefore the differential pressure that must be overcome in order to actuate the valve is lower than in other mixing units where a large stopper-type air valve is used. For this reason, very large air flows can be accommodated with diaphragms having a diameter on the order of only 3 or 4 inches. Furthermore, it will be noted that a substantially complete opening is provided when the axial motion of the valve element is only about half its length. A travel of at least twice this length would be necessary to get the same air flow characteristics in conventional air valves. For this reason less total energy and less time are required to open the valve. Therefore, the valve is more responsive to small pressure changes and its response time is greatly decreased when compared to conventional constructions. The foregoing structure of the air valve is known and is more fully described in U.S. Pat. No. 3,545,948.

A pressure communication passageway for communication of a fluid pressure signal to the actuation chamber 119 above the diaphragm 20 is formed by a passage 170 in the upright wall 80 of the core member 79, by a passage 172 in the sidewall of the intermediate housing section 34, by a passage 174 in the diaphragm mounting plate 40, and by a passage 176 in the base of the cover 116 leading to the actuation chamber, all of the passages being in fluid communication with one another. An O-Ring 178 is provided in a wall recess of passage 172 at its juncture with the passage 174 in the diaphragm mounting plate to seal the passages at the juncture. The actuation chamber receives a fluid pressure signal through the pressure communication passageway from the opening of passage 170 in the intermediate portion 31 of the air duct just below the upper opening of the air valve. The pressure at this point is a function of the air supply pressure (ambient or supercharged), of the velocity of the air past the opening 170, and, in the embodiment illustrated, also of the setting of the throttle valve and of the engine speed and load. These relate both to downstream pressures, and to the rate of flow in the intake manifold 24 (and thereby through the mixing device). However, for convenience purposes, the pressure at the opening of passage 170, and in the actuation chamber 119, will simply be referred to as a derivative of the intake manifold pressure.

The operation of the mixing device should now be easily understood in view of the foregoing. When the engine is inoperative, ambient air pressure is present in the actuation chamber and spring 124 causes the composite valve member 15 to move downwardly until it reaches its closed position, as shown in FIG. 2. In this position, the movable air valve seats 154, 156 are seated against the stationary air valve seats 158, 160, and the air valve comprised thereby is closed. Also the fuel valve head 18 is inserted within the fuel valve seat 52, and the end cap 134 is fully seated against the upper surface of the fuel valve seat to further seal the fuel inlet.

When the engine is to be started and fuel pressure is present at the fuel inlet, cranking of the engine with the throttle open will exert a negative pressure, or vacuum, in the actuation chamber via the pressure communication passageway, and air supply pressure is present at the bottom surface of the diaphragm. This will cause the diaphragm and the connected composite valve member 15 to move upwardly against spring 124 and open the fuel and air valves by lifting the fuel valve head 18 above the fuel valve seat 52 and the movable air valve seats 154, 156 above the stationary air valve seats 158, 160, as shown in FIG. 1. Air then flows through the air duct of the housing from the air inlet 13, through the space about the cover 116, through the air passages 91 in the diaphragm mounting plate, through the air passages 166, 168 on both sides of the seating ring 148, through the passages 88, 64 and 66 in the core member, spacer plate and base respectively, and finally through the discharge outlet 14. At the same time, fuel flows from the fuel inlet, through the space between the bottom 90 of the conical core section 82 and the spacer plate 38 into the air duct where it mixes with the air and flows with the air as an air/gas mixture through the passages 64, 60 in the spacer plate and base 32 and from there through the discharge outlet 14 into the adapter 26 and from there into the intake manifold of the engine. It should be well understood by those skilled in the art that depending on the pressure in the actuation chamber 119, which as explained is derived from the pressure in the engine intake manifold, the air and fuel valves can assume any number of intermediate positions (all collectively referred to as an "open" position) whereby an appropriate mixture for a given speed and engine load is provided.

The composite valve member 15 is returned by spring 124 to its closed position and the air and fuel valves are thereby closed whenever a negative or vacuum pressure signal from the air intake manifold is not present in the actuation chamber. This is a desirable safety factor in that the fuel inlet is thereby automatically closed whenever the engine is not in operation.

Advantageously, the degree to which the fuel valve is opened may be adjusted independently and together with the adjustment provided by the movement of the diaphragm 20 by the stepper motor 22 acting in response to a control signal from a feed back controller or other controller. The diaphragm may be conveniently considered to be part of a fluid motor or first actuator or actuator means and the stepper motor a second actuator or actuator means for the fuel valve. It should be understood that other actuating means can be provided in lieu of the fluid motor or stepper motor. A control signal from the controller to the stepper motor to reduce the fuel flow causes the motor to operate in a direction which moves the interconnected worm screw 128, connecting rod 132 and fuel head 18 downwardly to reduce the opening of the fuel valve and fuel flow. Movement is in an opposite direction when a control signal is sent to the motor to open the fuel valve and thereby increase the fuel flow. It should be obvious that the air fuel mixture discharged from the device will be dependent upon the opening of the fuel valve.

Figure 5:
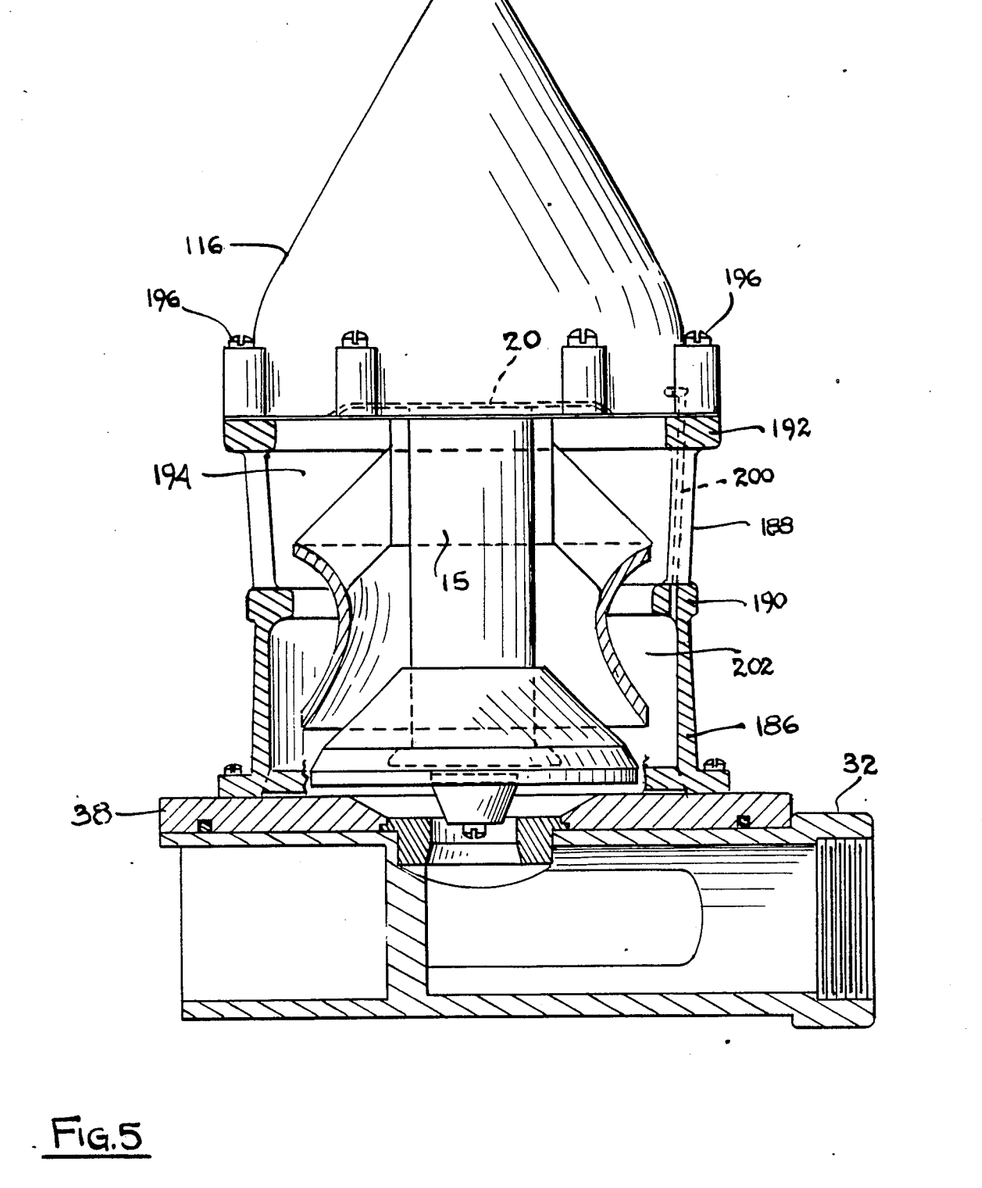
FIG. 5 is a side elevation, partially in cutaway axial cross-section, of an alternate embodiment of the invention.

An alternate embodiment of the air-gas mixing device is shown in FIG. 5. In this embodiment, the housing of the device is modified to provide an air inlet through the side of the housing instead of through the top of the housing when it is desirable to have a side entry because of space or other considerations. The alternate embodiment has a base 32, spacer plate 38, composite valve member 15, and an actuation chamber and cover 116 identical to the first embodiment.

Connected to the base 32 is a core member 186 that has a lower portion substantially identical to the removable core member of the first embodiment except that it has a plurality of posts 188 which extend upwardly from a flange 190 and which support a peripheral ring 192 at their upper ends. The posts are spaced apart and leave a substantially annular air inlet 194 between them. Air is therefore able to penetrate to pass to the inside of the flange 190 without impediment other than from the four posts which constitute only a relatively small restriction. The above construction is similar to that shown in U.S. Pat. No. 3,545,948 previously referred to.

The cover 116 is fastened to the ring 192 by screws 196 and a diaphragm 20, identical to that of the first embodiment, is clamped between the cover and the ring at its outer perimeter forming an actuation chamber between the diaphragm and the cover. A pressure communication passageway 200 for the passage of a fluid pressure to the vacuum chamber to activate the diaphragm is formed by a passage extending upwardly through flange 190, through one of the posts 188, through the ring portion 192 and sideways through the base of of the cover to provide fluid communication between the actuation chamber and an intermediate portion 202 of the air duct extending through the housing from the air inlet between the posts. Other structural features are the same as shown in the first embodiment.

The operative aspects of the second embodiment are the same as described for the first embodiment, except air enters through the side of the housing before passing downwardly through the air valve.

Now that the invention has been described, it should be obvious that the inventive device has a number of advantageous features. First, actuation of the fuel valve by the diaphragm in response to intake manifold pressure of the engine adjusts the opening of the fuel valve to provide an effective air/fuel mixture under most engine operating conditions. Secondly, by use of the stepper motor, the opening of the fuel valve, and thereby the air/fuel mixture, may easily be further adjusted to compensate for different gaseous fuels by a remote electrical control signal, but yet allowing the fuel valve to be adjusted for changes in engine load conditions by the intake manifold pressure acting on the diaphragm. Thirdly, when the stepper motor is used with a feedback controller, receiving inputs from speed, oxygen and other sensors measuring engine performance, a means is provided to monitor engine performance and vary the air/fuel mixture in response to actual engine performance to provide the most optimum engine air/fuel mixture. This results in better engine performance, fuel economy and pollution control. Fourthly, adjustment of the air/fuel mixture by the stepper motor for differences in fuel or in response to a feedback control signal can be quickly accomplished as the fuel valve is already prepositioned in the approximate required location by the diaphragm actuator. Another advantageous feature of the device is that because the fuel valve head and seat and are easily removable and may be substituted with others of different size or configuration, it is possible to form the most optimum orifices for the conditions involved without extensive modification of the device. Still, another advantage is that the nature and construction of the device is such that the device is extremely reliable, simple in operation, easily disassembled for repair or modification in the field, and economically feasible to manufacture.

This invention is not to be limited by the embodiments shown in the drawings and described in the description which is given by way of example and not of limitation, but only in accordance with the scope of the appended claims.

I claim:

1. An air gas mixing device of the type used to mix gaseous fuel with air as an air/fuel mixture for discharge into an air intake conduit means of an internal combustion engine, comprising:

a housing having an air duct extending through the housing, the air duct having an air inlet and an air-fuel mixture discharge outlet downstream of the air inlet in the direction of fluid flow, the housing arranged to be connected to the air intake conduit means of the engine so that the discharge outlet of the air duct is in communication with said intake conduit means;

an air valve for controlling the rate of air flow through said air duct;

a primary fuel inlet in communication with said air duct for delivery of gaseous fuel for mixture with air flowing through said air duct;

a fuel valve for controlling the rate of fuel flow through said fuel inlet, the fuel valve having open and closed positions, and the rate of fuel being delivered through said fuel inlet being dependent on the degree to which said fuel valve is opened;

a first fuel valve actuator means automatically operated by a remote first fuel valve control signal for moving the fuel valve in an open position to a predetermined degree in response to the first fuel valve control signal; and a second fuel valve actuator means automatically operated by a remote second fuel valve control signal for adjusting the opening of the fuel valve independently of and relative to the first fuel valve actuator means in response to the second control signal whereby the fuel valve is opened to a predetermined degree by said first actuating means in response to said first control signal and the opening thereafter adjusted by said second actuating means in response to said second control signal to provide an optimum fuel delivery rate.

2. The device of claim 1 in which the second fuel valve actuator means is carried on said first fuel valve actuator means and moves the fuel valve relative to the first actuator means.

3. The device of claim 1 in which said first fuel valve actuator means comprises a fluid motor.

4. The device of claim 3 wherein said fluid motor includes a diaphragm connected to the fuel valve by a structural member for movement of the fuel valve by the diaphragm, the diaphragm arranged for exposure on one side to air pressure within the air duct and on the other side to a fluid pressure signal derived from fluid pressure in the air intake conduit means of the engine, and the fluid pressure signal being said first fuel valve control signal.

5. The device of claim 4 in which the second fuel valve actuator means includes an electro-mechanical actuator for adjusting the opening of said fuel valve, the actuator being operated by the second remote control signal, and the actuator being mounted to and movable with said diaphragm but connected to the fuel valve by a structural member in a manner which permits the fuel valve to be moved independently by said electro-mechanical actuator and relative to the movement of the diaphragm.

6. The device of claim 1 in which the second fuel valve actuator means comprises an electro-mechanical actuator for adjusting the opening of said fuel valve, the actuator being operated in response to said second control signal, and the actuator being connected to the fuel valve by a structural member in a manner which permits the fuel valve to be independently moved by said electro-mechanical actuator while being actuated by said first actuator means.

7. The device of claim 6 in which the electro-mechanical actuator is a stepper motor.

8. The device of claim 1 further including an air valve actuator means for adjusting the opening of said air valve, the air valve actuator means and said first fuel valve actuator means comprising a common actuating means, and said air valve and fuel valve being operatively coupled to and actuated in unison by said common actuating means.

9. The device of claim 8 in which the common actuating means includes a fluid motor having a diaphragm connected to the fuel valve for movement of the fuel valve by the diaphragm, the diaphragm arranged for exposure on one side to air supply pressure and on the other side to a fluid pressure signal derived from fluid pressure in the air intake conduit means of the engine, and the fluid pressure signal comprising said first control signal.

10. The device of claim 9 in which the second fuel valve actuator means includes an electro-mechanical actuator for adjusting the opening of said fuel valve, the actuator being operated by the second remote control signal, and the actuator being mounted to and movable with said diaphragm but connected to the fuel valve by a structural member in a manner which permits the fuel valve to be moved independently by said electro-mechanical actuator and relative to the movement of the diaphragm.

11. The device of claim 10 in which the electro-mechanical actuator is a stepper motor mounted on the diaphragm.

12. An air gas mixing device of the type used to mix gaseous fuel with air as an air/fuel mixture for discharge into an air intake conduit means of an internal combustion engine comprising:

a housing having an air duct extending through the housing, the air duct having an air inlet and an air-fuel mixture discharge outlet downstream of the air inlet in the direction of fluid flow, the housing arranged to be connected to the air intake conduit means of the engine so that the discharge outlet of the air duct is in communication with said intake conduit means;

an air valve for controlling the rate of air flow through said air duct, the air valve having open and closed positions;

a primary fuel inlet in communication with said air duct for delivery of gaseous fuel for mixture with air flowing through said air duct;

a fuel head in operative arrangement with the fuel inlet for controlling flow of fuel through said fuel inlet, the fuel valve head having open and closed positions and the rate of fuel flowing through the fuel inlet being dependent on the degree to which the fuel head is opened;

said fuel inlet in fluid communication with said air duct for delivery of gaseous fuel for mixture with air flowing through the air duct;

said air valve and said fuel valve head being operatively coupled together;

a first actuator means automatically operated by a remote first fuel valve control signal for moving the fuel valve head and air valve in an open position to a predetermined degree in response to the first control signal;

the first actuating means comprising a fluid motor having a diaphragm connected to the fuel valve head by a structural member for movement of the valve head by the diaphragm, the diaphragm arranged for exposure on one side to air pressure within the air duct and on the other side to a fluid pressure signal derived from fluid pressure in the air intake conduit means of the engine, the fluid pressure signal being said first control signal;

a second actuator means automatically operated by a remote second fuel valve control signal for adjusting the opening of the fuel valve head independently of and relative to the first fuel valve actuator means in response to the second control signal after said fuel valve is preliminarily opened by said first actuator means for optimum fuel delivery;

said second actuator means being carried on said diaphragm but connected to the fuel valve head by a structural member in a manner which permits the fuel valve head to be moved independently by said second actuator means and relative to the movement of the diaphragm; and biasing means for biasing said air valve and said fuel valve head toward their closed position.

13. The device of claim 12 further including sealing means for sealing said fuel inlet when the engine is inoperative, said sealing means being biased in a sealed position by said biasing means and said sealing means being connected to and operatively actuated by said first actuator means to unseal the fuel inlet.

14. The device of claim 13 wherein said sealing means comprises a flexible seal mounted to a an end cap at the base of a structural member attached to and actuated by said first actuator means, the end cap being suitably positioned to be placed over and in sealing contact with the fuel inlet when the engine is inoperative.

15. The device of claim 12 in which the second actuator means includes an electro-mechanical actuator for adjusting the openings of said fuel valve, the actuator being operated by the second remote control signal and the actuator being mounted to and movable with said diaphragm and connected to the fuel valve head by a structural member in a manner which permits the fuel valve head to be independently moved by said electromechanical actuator.

16. The device of claim 15 wherein said second actuator means includes a stepper motor.

17. A process for controlling the air/fuel mixture of an air-gas mixing device of the type having primary air and gas valves for supplying an air fuel mixture into a mixing chamber for discharge into an air intake conduit means of an internal combustion engine comprising the steps of automatically opening the air and gas valves with a first actuating means to a predetermined degree in response to a first remote control signal and thereafter adjusting the opened gas valve independently by a second actuator means in response to a second remote control signal for obtaining an optimum air/fuel mixture.

18. A process as claimed in claim 17 further comprising opening the gas valve and air valve in unison to a predetermined degree with said first actuating means in response to the first control signal.

19. A process as claimed in claim 17 wherein the first control signal is derived from a fluid pressure signal from the intake manifold conduit means and the second control signal is derived from a source monitoring engine output performance.

* * * * *